Dec. 2, 1941. H. SINCLAIR 2,265,107
HYDRAULIC POWER TRANSMITTER
Filed Aug. 10, 1939 2 Sheets-Sheet 1
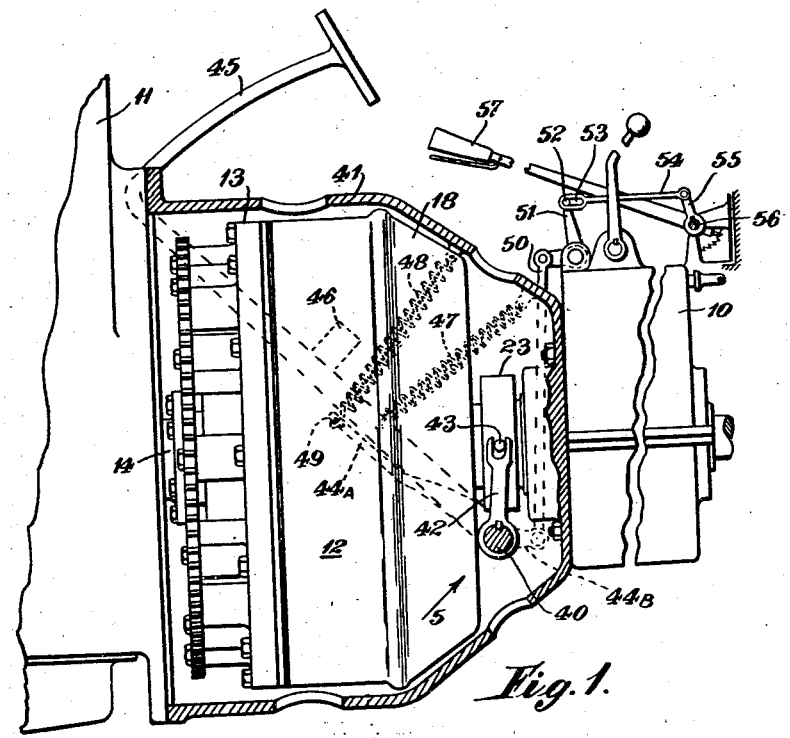
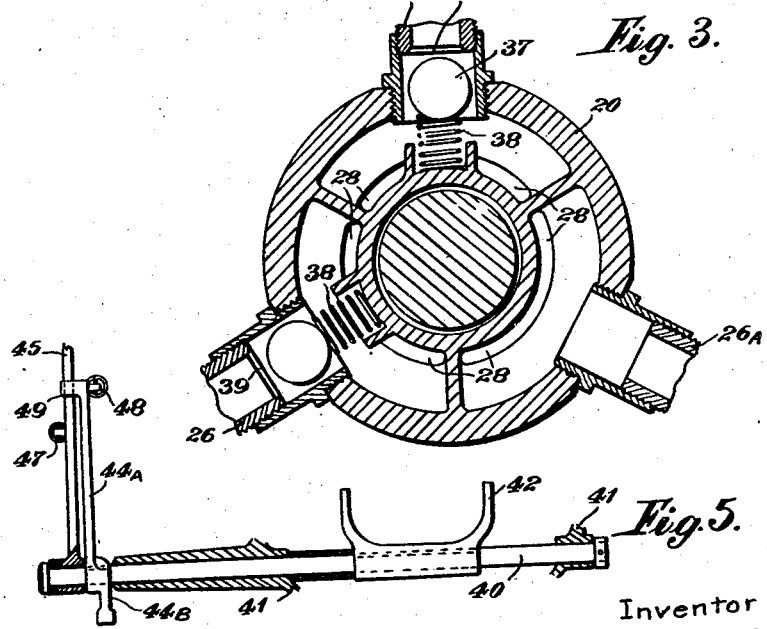
Inventor
Harold Sinclair
by
Dean, Fairbank & Hirsch
Attorneys

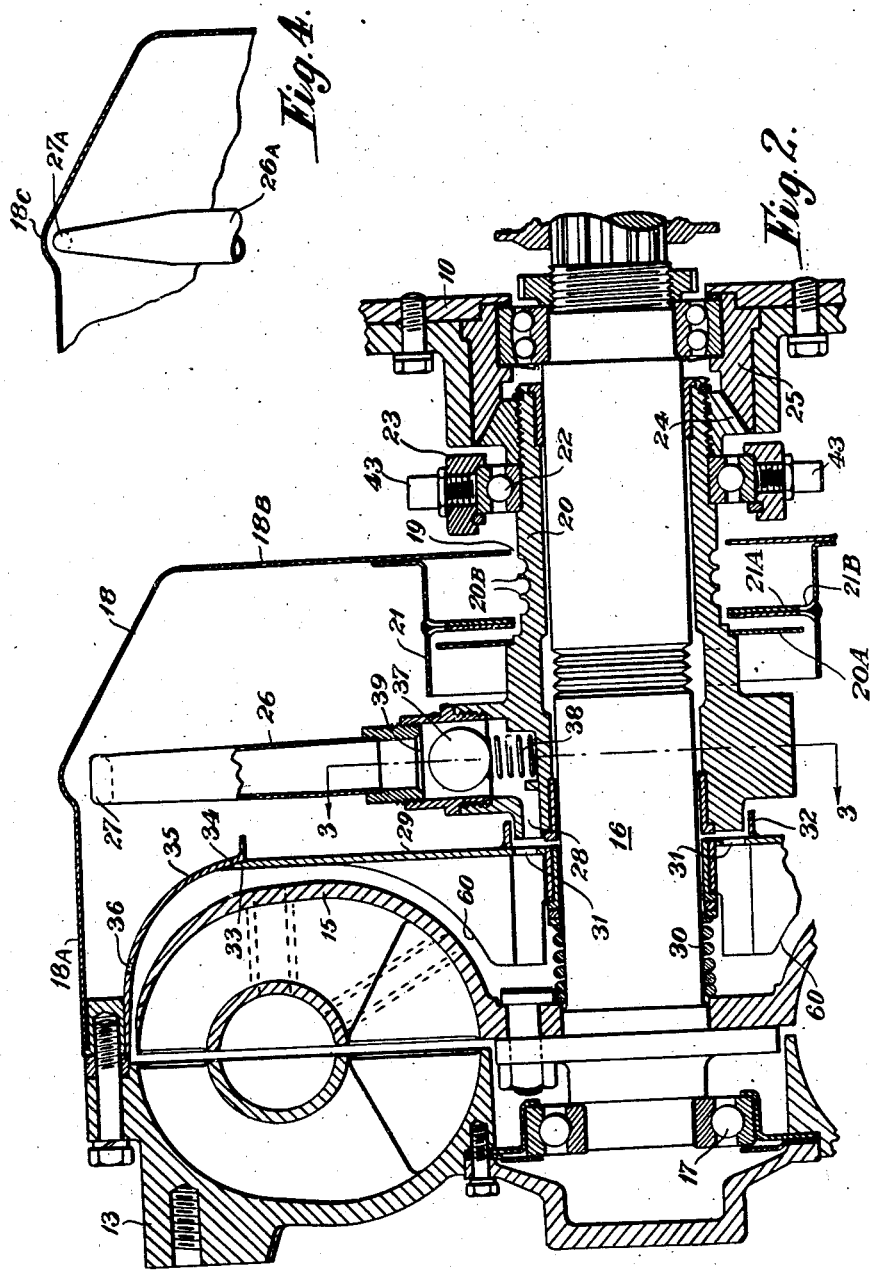

Patented Dec. 2, 1941

2,265,107

UNITED STATES PATENT OFFICE 2,265,107

HYDRAULIC POWER TRANSMITTER

Harold Sinclair, Kensington, London, England

Application August 10, 1939, Serial No. 289,345
In Great Britain August 12, 1938

13 Claims. (Cl. 192—12)

This invention relates to hydraulic power transmitters of the kinetic type and especially to such transmitters as are suitable for use in vehicles driven by internal-combustion engines.

It has been attempted to provide a vehicle, driven by an internal-combustion engine, with a hydraulic coupling of the kinetic type in place of the usual friction clutch between the engine and mechanical change-speed gearing of the sliding-pinion type or of the type having gear-selecting jaw clutches, and to provide the coupling with a reservoir capable of receiving the whole liquid content of the working chamber and with controllable liquid transfer means for emptying the working circuit into the reservoir and vice versa, the object being to disconnect the drive through the coupling by completely emptying its working circuit when gear changes were to be made in the mechanical gearing. It was found however that it was impossible to empty and to refill the working chamber quickly enough for gear-changing under practical conditions. Furthermore, it is often difficult to provide such a reservoir on a vehicle. A stationary reservoir is objectionable as it requires large transfer ducts and it is difficult to keep such a system liquid-tight. If the reservoir is arranged to rotate coaxially with the hydraulic coupling, a reservoir diameter which is convenient from hydraulic considerations is too large for other reasons, for example on a motor-car it would render the ground clearance unduly small. If the necessary reservoir capacity is obtained by making the rotary reservoir long, the coupling will be much longer than a conventional friction clutch and it is difficult to prevent leakage through a labyrinth gland when the car and engine are stopped on a steep up grade. Furthermore, the relatively long unsupported length of the coupling will aggravate transverse vibration and involve substantial redesigning of the vehicle.

An object of the present invention is to provide in or for a vehicle power transmission system a hydraulic power transmitter having an improved arrangement of rotary reservoir whereby the above-mentioned difficulties are avoided.

This invention is particularly applicable to systems in which gear-changes can be made, in the change-speed gearing that is driven through the hydraulic power transmitter, while the vehicle is running without disconnecting the drive between the engine and the change-speed gearing. For example the change-speed gearing may be of the synchro-self-shifting type described in my Patent 2,245,017 issued June 10, 1941, or of the synchromesh type associated with an isolating free-wheel coupling. With such change-speed gears it is necessary to disconnect the drive through the hydraulic power transmitter connecting the engine and the gearing only when the vehicle is stationary with the engine running, for the purpose of enabling changes between neutral and a gear position, or between forward and reverse to be carried out. When the driving engine is idling and the runner of a continuously-filled hydraulic coupling driven thereby is stalled, the drag torque in the coupling ranges normally from 10 to as much as 40 per cent of the normal full-load torque, depending on the idling speed and the design of the coupling, the lower figure stated being that for a "traction" type Vulcan-Sinclair coupling and an engine having a normal idling speed. Even this drag torque is sufficient to make gear-changing practically impossible while the vehicle is stationary, and in the case of public service vehicles which have governed Diesel engines and which are repeatedly stopped with the engine running the drag torque represents a certain addition to the idling fuel consumption of the engine.

According to the present invention in one aspect, in or for use in a vehicle driven by an internal-combustion engine and having change-speed gearing which may be of the kind in which, if drag torque is present when the vehicle is stationary and the engine is running, it is difficult to make gear changes between neutral and a running gear, or between forward and reverse, there is provided for connecting the engine to the gearing a hydraulic power transmitter comprising a rotatable reservoir chamber and automatic or controllable liquid transfer means which include a scoop disposed in the reservoir chamber for engaging liquid therein and transferring it to the working chamber and a discharge port which may be supplemented or controlled by a rapid-emptying valve for transferring liquid from the working chamber to the reservoir chamber, the effective maximum capacity of said reservoir chamber being between 50 and 70 per cent of the normal maximum liquid content of said working chamber, that is the content that yields minimum slip in said transmitter at normal running speeds.

Such a reservoir is more easily accommodated on a vehicle than a reservoir adapted to contain the whole of the coupling liquid. If the normal maximum liquid content of the working chamber of a Vulcan-Sinclair coupling is reduced, for example, by 55 per cent., the idling drag torque is reduced to roughly one-tenth of its normal value, and this reduced value is low enough to enable the changes for example between forward and reverse gears to be made without difficulty if there is no pause in neutral.

It is at present preferred to use a reservoir having a 60 per cent. capacity and to provide a driver's common control member for the scoop and for the rapid-emptying valve, the arrangement being such that when this valve is open the scoop is prevented from delivering any substantial flow of liquid to the working chamber. Thus the scoop may be capable of rotating freely co-axially with the transmitter, being retarded or arrested to bring it into operation, or the scoop may be arranged to pivot about an axis parallel to the axis of rotation of the transmitter. Alternatively the duct leading from the scoop to the working chamber may be provided with a two-way valve delivering alternatively to the working chamber and back to the reservoir. The control means are preferably so connected with one of the vehicle brakes, for example the hand brake of a road vehicle, that application of the brake causes partial emptying of the working chamber.

The rapid-emptying valve means may be of the hydraulically controlled type, as described in my Patent 2,187,667 issued January 16, 1940, with reference to Fig. 4 thereof.

A further object of this invention is to provide an improved form of rapid-emptying valve for the working circuit of a hydraulic power transmitter, this valve being constituted by a disk or equivalent valve element displaceable axially of the transmitter.

Another object is to provide an improved form of scooping means for transferring liquid from the reservoir chamber to the working chamber and capable of handling a small flow for cooling purposes and a large flow for rapid filling of the working chamber.

Further objects and advantages of the present invention will be apparent from the description of an embodiment thereof as applied to a motor omnibus and now given with reference to the accompanying drawings, in which:

Fig. 1 is a side elevation of part of the transmission system, a portion of the transmission housing being shown in section, Fig. 2 is a section of part of the transmission mechanism, Fig. 3 is a section on the line 3—3 in Fig. 2, Fig. 4 is a section of a detail, and Fig. 5 is a section of another detail as viewed in the direction of the arrow 5 in Fig. 1.

In Fig. 1, 10 denotes a mechanical change-speed gearing arranged for synchronous gear-changing while running as described in my said Patent No. 2,245,017 with reference to Fig. 2 thereof, being provided with jaw clutches for changing between forward and reverse. This gearing is coupled to a driving engine 11 by a hydraulic coupling 12. As shown in Fig. 2, the working circuit, which is of ordinary Vulcan-Sinclair proportions, consists of an impeller 13 coupled to the engine crankshaft 14 (Fig. 1) and a runner 15 fixed to a shaft 16 which serves as the gear box input shaft and the front end of which is journalled at 17 in the impeller boss. The runner 15 may be provided with the usual passages (shown in dotted lines) formed in the vanes for the transfer of liquid and air between the core of the working circuit and the space behind the runner.

A reservoir casing 18 has a substantially cylindrical portion 18A fixed at one end to the periphery of the impeller, the diameter of this portion being substantially equal to or slightly larger than the outer profile diameter of the working circuit. The other end of the casing is constituted by an end wall 18B having a central aperture 19 through which pass the runner shaft 16 and a sleeve 20 journalled and axially slidable on this shaft. A labyrinth gland seals the clearance between the reservoir casing 18 and the sleeve 20. This gland includes a tube 21 formed of two flanged parts welded together, the tube being welded to the inner face of the end wall 18B. An annular baffle disk 20A is fixed on the sleeve 20 within the mouth of the gland tube 21 and extends nearly to the inner surface of this tube. A flat annular baffle 21A is formed by flanges within the tube 21 behind the disk 20A and is provided at its periphery with axial drain holes 21B. Thrower rings 20B are formed on the exterior of the sleeve 20 and arranged to discharge any liquid that may pass the baffles 20A and 21A along the sleeve, into the annular channel defined by the baffle 21A, the inner part of the end wall 18B and the portion of the tube 21 between these parts, whence the liquid is returned to the reservoir through the drain holes 21B. When the coupling is at rest, the surface level of the liquid in it is far enough below the aperture 19 to prevent loss of liquid. The portion of the sleeve 20 outside the reservoir casing 18 carries a thrust bearing 22 associated with a shifting ring 23 operable for moving the sleeve axially. To the rear end of the sleeve is fixed a brakable member, such as a conical disk 24, adapted when the sleeve is in its rearmost position, to engage a fixed braking member, such as a conical drum 25 fixed to the casing of the gearing 10. On the portion of the sleeve within the casing is mounted one or more scoop tubes. For example there may be three tubes uniformly spaced round the sleeve, two of which, denoted by 26, have scooping mouths 27 positioned near the cylindrical wall of the reservoir chamber, and the third of which, denoted by 26A (Fig. 4), has its scooping mouth 27A accommodated in or partly in a circumferential outward bulge 18C in the reservoir wall. The bores of the scoop tubes communicate with circumferential ports 28 in the front end of the sleeve 20. The mouths 27 of the tubes 26 have a relatively large cross-sectional area, so that these two tubes have a relatively large flow capacity, while the mouth 27A of the tube 26A is restricted so as to give this tube a relatively small flow capacity.

A valve disk 29 is slidably fitted round the runner shaft 16 between the runner and the sleeve 20 and urged rearwards by a helical compression spring 30 disposed between the runner and the disk. This disk is provided with ports 31 registering with the circumferential ports 28 in the sleeve 20 and it is also provided with a rearwardly projecting tubular extension 32 engaging over the front end of the sleeve. The valve disk 29 may have a diameter of rather less than the outer profile diameter of the working circuit, for example roughly equal to the mean diameter of the core of the working circuit. Its outer edge is bevelled at 33 and is adapted to engage a correspondingly bevelled seating 34 formed on the inner edge of a dished annular inner casing 35 which shrouds the back of the outer part of the runner 15 and which is fixed by its outer edge to the impeller 13.

The inner casing 35 may be provided with one or more restricted drain ports such as 36. The large-capacity scoop tubes 26 are provided with non-return valves in the form of balls 37 urged by light springs 38 against seatings 39 on the inner ends of the scoop tubes.

The control mechanism, shown in Figs. 1 and 5, includes a cross shaft 40 which is journalled in the bell housing 41 and to which is keyed a yoke 42 engaged with pins 43 in the striking collar 23. To the shaft 40 is also keyed a two-armed lever 44A, 44B. A pedal 45 is journalled on the shaft 40 and is normally held up against a stop 46 by a spring 47. A spring 48 acts on the lever arm 44A and normally urges the striking collar 23 to the right as seen in Fig. 1. A projection 49 on the lever arm 44A lies in the path of the pedal 45 so as to be engaged when the pedal is depressed. The lever arm 44B is connected by a link 50, a bell-crank 51, a lost-motion connection 52, 53 and a link 54 to an arm 55 which is keyed to the hand brake shaft 56 of the vehicle and which is therefore constrained to move with the hand brake lever 57.

During normal operation, the sleeve 20 is in its rearmost position as shown in Fig. 2 and it is held stationary by the brake 24, 25. The valve 29 is kept closed at 34 by the spring 30, and the liquid that leaks from the working chamber to the reservoir chamber through the ports 36, or, where such ports are not provided, for example through the middle of the valve disk and other ports or clearances, is picked up by the small-capacity scoop tube 26A and returned to the working chamber through the ports 31 in the valve disk which forms part of the division wall between the working and reservoir chambers. Under these conditions the scoop tubes 26 are inoperative since there is not enough liquid in the reservoir chamber to engage their mouths, which do not extend so far from the axis of rotation as the mouth of the small-capacity scoop tube 26A. The non-return valves 37 prevent the escape back to the reservoir chamber of the scooped liquid.

When it is desired to reduce the drag torque while the engine is idling and the runner is stalled, the sleeve 20 is moved forwards by either depressing the pedal 45 or engaging the hand brake of the vehicle by raising the lever 57. Consequently the brake 24, 25 is disengaged, and the front end of the sleeve 20 abuts against the valve disk 29, moving it forwards off its seating 34. Since under these circumstances the motion of the liquid in the working chamber is such as to urge liquid strongly out of the working circuit through the gap between the impeller and the runner and into the space between the back of the runner and the inner casing 35, liquid is rapidly exhausted from the working chamber through the open valve into the reservoir chamber. The parts are preferably so proportioned that after about 60% of the liquid content of the working chamber is exhausted the emptying process ceases. The liquid in the reservoir carries the scoop tubes round with it, since the sleeve is free to rotate idly, and, as the scoop tubes are thus unable to scoop the liquid, they are prevented from delivering any flow of liquid to the working chamber. To refill the working chamber, the sleeve 20 is returned to its rearmost position by releasing the pedal 45 or by disengaging the vehicle brake. The sleeve is thereby braked, at the same time permitting the valve 29 to close. All three scoop tubes now return liquid to the working chamber which is thus rapidly filled, the small-bore tube alone dealing with the last stage of filling. The valve disk is normally located by its seating 33 on the inner casing and therefore preferably has a working clearance with respect to the runner shaft 16 and the cylindrical surface of the sleeve 20. Radial or partly radial vanes 60 may be provided on the front face of the valve disk 29 to assist in refilling of the circuit.

When the engine is idling and the runner is rotating freely, e. g. when the mechanical gearing behind the hydraulic coupling is in neutral, it is necessary to discharge liquid from the working chamber to the reservoir chamber so as to reduce the torque-transmission capacity of the coupling to a minimum and thereby facilitate the engagement of forward or reverse drive when the vehicle is to be restarted. Normally, when the vehicle has been brought to rest, the vehicle hand brake will have been kept engaged by the lever 57 so that the sleeve 20 is kept in its forward position. Otherwise it will be necessary to depress the pedal 45 and so move the sleeve 20 to its forward position. In either case the brake 24, 25 is disengaged, and the front end of the sleeve 20 opens the valve 29 in the manner already described. Under these circumstances a substantial part of the liquid in the working chamber, which had previously formed an inert rotating ring, will overflow the edge of the inner casing 35 into the reservoir chamber, while a portion will pass from the working chamber to the reservoir chamber through the ports 36, the liquid content of the working chamber being in this manner sufficiently reduced to render gear engagement free from difficulty. After a gear has been engaged, the working chamber is filled in the manner previously described.

I claim:

1. A hydraulic power transmitter of the kinetic type comprising a working chamber including a runner, a rotatable reservoir chamber having an effective maximum capacity of between 50 and 70 per cent of the normal maximum liquid content of said working chamber, and liquid transfer means including a scoop disposed in the reservoir chamber for engaging liquid therein, a duct leading from said scoop to said working chamber, and means effective for discharging liquid from said working chamber to said reservoir chamber both when said runner is stalled and when it is rotating freely.

2. A hydraulic power transmitter of the kinetic type comprising a working chamber, a rotatable reservoir chamber having an effective maximum capacity of between 50 and 70 per cent of the normal maximum liquid content of said working chamber, and liquid transfer means including a scoop disposed in the reservoir chamber for engaging liquid therein, a duct leading from said scoop to said working chamber, and a rapid-emptying valve for transferring liquid from said working chamber to said reservoir chamber.

3. A hydraulic power transmitter of the kinetic type comprising a working chamber including a runner, a rotatable reservoir chamber having an effective maximum capacity of substantially 60 per cent of the normal maximum liquid content of said working chamber, and liquid transfer means including a scoop disposed in the reservoir chamber for engaging liquid therein, a duct leading from said scoop to said working chamber, and means effective for discharging liquid from said working chamber to said reservoir chamber both when said runner is stalled and when it is rotating freely.

4. A hydraulic power transmitter of the kinetic type comprising a working chamber, a rotatable reservoir chamber having an effective maximum capacity of between 50 and 70 per cent of the normal maximum liquid content of said working chamber, and liquid transfer means including a scoop disposed in the reservoir chamber for engaging liquid therein, a duct leading from said scoop to said working chamber, a rapid-emptying valve for transferring liquid from said working chamber to said reservoir chamber, and common control means for said scoop and said rapid-emptying valve so arranged that when said valve is open said scoop is prevented from delivering any substantial flow of liquid to said working chamber.

5. In a power-driven vehicle having a vehicle brake, a power transmission system including a hydraulic power transmitter of the kinetic type comprising a working chamber, a rotatable reservoir chamber having an effective maximum capacity of between 50 and 70 per cent of the normal maximum liquid content of said working chamber, and liquid transfer means including a scoop disposed in the reservoir chamber for engaging liquid therein, a duct leading from said scoop to said working chamber, a rapid-emptying valve for transferring liquid from said working chamber to said reservoir chamber, and common control means for said scoop and said rapid-emptying valve so arranged that when said valve is open said scoop is prevented from delivering any substantial flow of liquid to said working chamber, said common control means being interconnected with said vehicle brake by a connection which on application of said brake actuates said control means to cause partial emptying of said working chamber.

6. A hydraulic power transmitter of the kinetic type comprising an impeller, a runner for co-operation with said impeller, a rotary reservoir casing co-axial with said impeller and runner, an inner casing within said reservoir casing and fixed to said impeller to form therewith a working chamber, said inner casing enclosing said runner and having a central aperture for exhausting liquid from said working chamber, a co-axially disposed longitudinally movable disk valve cooperating with said aperture for controlling the discharge of liquid from said working chamber to said reservoir chamber, and means for transferring liquid from said reservoir to said working chamber.

7. A hydraulic power transmitter of the kinetic type comprising an impeller, a rotatable working chamber, a rotatable reservoir chamber at least in part enclosing said working chamber, said chambers being connected for rotation with said impeller, a division wall between said chambers having a central aperture for exhausting liquid from said working chamber under the influence of its energy of motion, an axially displaceable member for co-operation with said wall to seal said aperture, means for displacing said member to open said aperture, a scoop for engaging liquid in said reservoir chamber, and a duct leading from said scoop to said working chamber.

8. A hydraulic coupling of the kinetic type comprising an impeller, a runner juxtaposed to said impeller, a reservoir casing constrained to rotate with said impeller, an inner casing which covers the back of said runner, which forms with said impeller a working chamber and which divides said working chamber from the reservoir, said inner casing including a rapid-emptying disk valve displaceable axially of the coupling, means for controlling the displacement of said valve, and means for transferring liquid from said reservoir to said working chamber.

9. A hydraulic power transmitter of the kinetic type comprising a working chamber, a rotary reservoir chamber co-axial with said working chamber, means for discharging a limited flow of liquid from said working chamber to said reservoir chamber, and scooping means in said reservoir chamber and communicating with said working chamber, said scooping means including a small capacity scoop tube capable of returning said limited flow from said reservoir chamber to said working chamber and a larger capacity scoop for rapid filling of said working chamber.

10. A hydraulic power transmitter of the kinetic type comprising a working chamber, a rotary reservoir chamber co-axial with said working chamber, means for discharging a limited flow of liquid from said working chamber to said reservoir chamber, and liquid transfer means in said reservoir chamber and communicating with said working chamber, said liquid transfer means including a hollow rotatable member, a scoop tube having a relatively small flow capacity and mounted on said member for passing said limited flow, a scoop tube having a relatively larger flow capacity and also mounted on said member and extending radially of the axis of said transmitter for a shorter distance than said first-mentioned scoop tube, a non-return valve associated with said second-mentioned scoop tube, and means for restraining the rotation of said hollow member.

11. In an automotive vehicle, a propelling system including, in series with mechanical gearing, a hydraulic coupling of the kinetic type comprising a working chamber, a rotatable reservoir chamber having an effective maximum capacity of between 50 and 70 per cent. of the normal maximum liquid content of said working chamber and at least in part enclosing said working chamber, means for discharging liquid from said working chamber to said reservoir chamber including a controllable rapid emptying valve, means for transferring liquid from said reservoir chamber to said working chamber including a scoop in said reservoir chamber, and a common control member for actuating said valve and for controlling the flow of liquid through said scoop.

12. A hydraulic coupling of the kinetic type comprising an impeller, a driven shaft, a runner mounted on said shaft and juxtaposed to said impeller, a shell enclosing the back of said runner and fixed to said impeller to form therewith a working chamber, a casing fixed to said impeller and enclosing a reservoir chamber the maximum diameter of which is not substantially larger than that of said working chamber and the effective capacity of which is between 50 and 70% of the normal maximum liquid content of said working chamber, a rapid-emptying valve between said working and reservoir chambers, liquid transfer means including a tubular support surrounding said driven shaft and a scoop mounted on said support within said reservoir chamber and discharging into said working chamber, means for controlling the flow of liquid through said scoop, and a labyrinth gland sealing a clearance between said reservoir casing and said tubular support.

13. A hydraulic coupling of the kinetic type comprising a working chamber, a rotary reservoir chamber, said chambers having a common division wall provided with a valve port, an axially displaceable valve member co-operating with said port, a rotatable and axially displaceable support penetrating said reservoir chamber, a scoop mounted on said support within said reservoir chamber and discharging into said working chamber, means for braking said support, and control means operable for displacing said support in one direction to engage it with said braking means and in the other direction to co-operate with said valve and open the same.

HAROLD SINCLAIR.